United States Patent
Söhnchen et al.

(10) Patent No.: US 9,517,748 B2
(45) Date of Patent: Dec. 13, 2016

(54) QUICK-RELEASE FASTENER FOR ONE END OF A SEAT BELT FASTENED TO A VEHICLE IN A MOTOR VEHICLE

(71) Applicant: Autoliv Development AB, Vårgårda (SE)

(72) Inventors: Arndt Söhnchen, Hamburg (DE); Helge Köster, Henstedt-Ulzburg (DE); Jens Ehlers, Horst (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/652,597

(22) PCT Filed: Dec. 12, 2013

(86) PCT No.: PCT/EP2013/076374
§ 371 (c)(1),
(2) Date: Jun. 16, 2015

(87) PCT Pub. No.: WO2014/095562
PCT Pub. Date: Jun. 26, 2014

(65) Prior Publication Data
US 2015/0329075 A1 Nov. 19, 2015

(30) Foreign Application Priority Data
Dec. 17, 2012 (DE) .................... 10 2012 223 453

(51) Int. Cl.
*B60R 22/18* (2006.01)
*A44B 11/25* (2006.01)
(Continued)

(52) U.S. Cl.
CPC .......... *B60R 22/18* (2013.01); *A44B 11/2534* (2013.01); *A44B 11/2576* (2013.01); *F16G 11/02* (2013.01);
(Continued)

(58) Field of Classification Search
CPC ............. A44B 11/2534; A44B 11/2576; B60R 2022/1806; B60R 22/18; B60R 22/1952; F16G 11/02; Y10T 24/4501
See application file for complete search history.

(56) References Cited

U.S. PATENT DOCUMENTS 3,555,632 A    1/1971  Lindblad
4,228,567 A *  10/1980 Ikesue ............... A44B 11/2511
                                                        24/642
(Continued)

FOREIGN PATENT DOCUMENTS

DE         102 45 818 A1    4/2003
DE    10 2010 025 714 A1    1/2010

OTHER PUBLICATIONS

PCT International Search Report—May 2, 2014.
German Examination Report—Aug. 30, 2013.

*Primary Examiner* — Robert J Sandy
*Assistant Examiner* — David Upchurch
(74) *Attorney, Agent, or Firm* — Brinks Gilson & Lione (57) ABSTRACT

A quick-release fastener for a vehicle seat belt (21) with a fitting part (1), and a fastening part (7). The fitting part (1) has a first opening (2), and a second opening (3), in which the fastening part (7) can be locked to a locking head (6). The fastening part (7) can be inserted into the opening (3) in which a spring element (14) is arranged in an assembly position (I), and the spring element (14) can be moved into the locked position (II). A housing (100) is adapted to the shape of the fitting part (1) with the locking head (6) retained therein. The mounting (112) is shaped n such that the fitting part (I) with the locking head (6) can be completely received in the mounting (112) only when the locking head (6) is in the locked position (II).

9 Claims, 8 Drawing Sheets (51) Int. Cl.
*F16G 11/02* (2006.01)
*B60R 22/195* (2006.01)

(52) U.S. Cl.
CPC .... *B60R 22/1952* (2013.01); *B60R 2022/1806* (2013.01); *Y10T 24/4501* (2015.01); *Y10T 24/4764* (2015.01)

(56) References Cited

U.S. PATENT DOCUMENTS

| | | | | |
|---|---|---|---|---|
| 4,373,830 | A | * | 2/1983 | Ikesue ................ A44B 11/2546 29/509 |
| 4,402,114 | A | | 9/1983 | Takagi et al. |
| 4,471,513 | A | * | 9/1984 | Ogawa .................... B60R 22/22 24/115 M |
| 4,520,538 | A | * | 6/1985 | Sano .................. A44B 11/2546 24/265 R |
| 4,575,916 | A | * | 3/1986 | Naitoh .................... B60R 22/22 24/579.11 |
| 4,674,303 | A | * | 6/1987 | Salcone, II ........ A44B 11/2576 206/807 |
| 4,731,912 | A | * | 3/1988 | Boriskie ............ A44B 11/2576 24/487 |
| 5,724,716 | A | * | 3/1998 | Perisho .................... B60T 7/04 29/517 |
| 2003/0071453 | A1 | * | 4/2003 | Holzapfel .......... A44B 11/2503 280/801.1 |

\* cited by examiner

QUICK-RELEASE FASTENER FOR ONE END OF A SEAT BELT FASTENED TO A VEHICLE IN A MOTOR VEHICLE

CROSS REFERENCE TO RELATED APPLICATIONS

This application claims priority to German Patent Application No. 10 2012 223 453.5, filed on Dec. 17, 2012, and PCT International Patent Application No. PCT/EP2013/076374, filed on Dec. 12, 2013.

FIELD OF THE INVENTION

The invention relates to a quick-release fastener for one end of a seat belt fastened to a vehicle in a motor vehicle.

BACKGROUND

Seat belts of the prior art are rigidly fastened with one end fitting to the structure of the motor vehicle, while the other end can be rolled on a belt roller (retractor) likewise rigidly positioned on the structure of the vehicle.

There are, however, different applications in which a separable connection must be provided between the end fitting and the structure of the vehicle. Thus, for example, in a seat belt safety system with an end fitting pretensioner there can be the requirement, for construction, assembly, or logistical reasons, that the end fitting pretensioner is first fastened on the structure of the vehicle or on a seat of the vehicle, and the safety belt with the end fitting is then connected in a second assembly step with the end fitting pretensioner via a quick-release. In this case, the assembly of the end fitting on the end fitting pretensioner occurs at the vehicle manufacturer, so that the quick-release fastener according to the manufacturer's requirements should be cost-effective and simple to operate. Moreover, the quick-release fastener should be so constructed that an improper assembly by the vehicle manufacturer can be ruled out even during a very rapid assembly.

Furthermore, such a quick-release fastener enables a separate manufacture and delivery of the end fitting pretensioner and the safety seat belt system at the vehicle manufacturer. In addition, a separable connection of the end of the safety seat belt system affixed to the vehicle to the motor vehicle can also be facilitated by the quick-release fastener, so that this end of the seat belt of the safety seat belt system can be disassembled with little effort.

Known from DE 10 2010 025 714 A1 is a quick-release fastener of the above described type with a fitting part and a fastening part affixed to the vehicle, wherein a first opening is provided in the fitting part in which one end of the seat belt can be fastened by means of a strap guided through the first opening, and a second opening is provided in which the fastening part can be locked with a locking head, wherein a spring element displaceable into a locking position from an assembly position is provided, and the fastening part with the locking head is insertable into the opening in which the spring element is positioned in the assembly position, and the spring element can be moved by performing a relative movement of the locking head to the fitting part into the locking position that secures the locking head against any slipping out.

The assembly of the quick-release fastener can be undertaken in only two assembly steps because of the proposed solution, namely by the insertion of the locking head into the second opening and finally by performing the relative movement of the locking head to the fitting part. Required for that is neither a special tool nor a special manual dexterity on the part of the assembling person. Furthermore, the quick-release fastener is constructed of three basic elements which can be cost-effectively produced in mass production. Thus the quick-release fastener is on the whole very cost-effective, both in its assembly and in its manufacture.

The object of the invention is to find a solution by means of which the assembly of a quick-release fastener of this type can be further simplified and, in particular, improper locking can be ruled out as much as possible after assembly.

To achieve the above described object, a quick-release fastener is proposed in accordance with this invention. Preferred embodiments of the invention are described by the figures and this specification.

SUMMARY AND INTRODUCTORY DESCRIPTION OF THE INVENTION

According to idea feature of the present invention, it is proposed that a housing is provided with a mounting adapted to the shape of the fitting part with the locking head retained therein, and this mounting is so shaped that the fitting part can only be completely accepted in the mounting with the locking head, if the locking head and/or the spring element are positioned in the fully assembled and locked position. By means of the housing with the appropriately shaped mounting, it can simultaneously be guaranteed, due to the complete insertion of the fitting part with the locking head, that the spring element, and thus also the locking head, is located in the locked position, as otherwise the fitting part would also not allow itself to be completely inserted into the mounting of the housing.

Because of its shape, the mounting, for all intents and purposes, forms a mechanical coding of information contained in the shape of the mounting on the relative required position of the spring element or the locking head to the fitting part in the locked position.

It is further proposed that at least one protrusion is provided on the mounting of the housing, the protrusion being so positioned that it engages, in the locked position of the spring element, into an opening that is unblocked by the movement of the spring element and/or the locking head from the assembly position into the locked position. The unblocked opening in practice represents a result by means of which the completion of the locking movement is directly verifiable by the protrusion being insertable into the opening. The protrusion, which in the locked position engages into the unblocked opening thereby forms an especially distinct embodiment of the shape-coding of the mounting, by means of which it is securely prevented that the fitting part, despite an erroneous position of the spring element, is not pushed, for example by the use of force, into the mounting, or that the housing is not secured by force around the fitting part without the locking head being locked. If the locking head or the spring head is not locked, and the opening is not unblocked, the protrusion forms a stop which makes the insertion of the fitting part into the mounting and the positioning of the housing on the fitting part impossible.

Moreover, the protrusion can be so shaped and positioned in the mounting that it pushes the locking head and/or the spring element into the locked position upon insertion into the unblocked opening. As a result, the quick-release fastener can also be assembled for the eventuality that the locking head and/or the spring element are still not completely locked in the locked position. The spring element and/or the locking head will then only be pressed into the locked position during the further inserting movement of the protrusion into the unblocked opening. It is thereby not necessary for the introduction of the protrusion that the opening is already completely unblocked at the beginning of the introduction movement. It suffices that the opening is unblocked far enough that at least a section of the protrusion can be introduced into the entry section of the opening, and the protrusion pushes the locking head and/or the spring element into the locked position during the further introduction movement. To that end, the protrusion and/or the opening can be constructed conically with a ramp-shaped contact area, whereupon the introduction movement of the protrusion forces a locking movement of the locking head and/or the spring element directed laterally to the introduction movement. As a result, the likelihood of an improper locking of the locking head and/or the spring element in the final position, in which the fitting part with the locking head is accepted completely in the mounting, can be further reduced.

It is also proposed that the protrusion is so shaped and positioned that the protrusion secures the spring element and/or the locking head, in the position of engagement in the opening, against any slipping out of the locked position. Due to the proposed shape and position of the protrusion, it can perform, in addition to its control function of properly locking the spring element and the locking head, a securing function in the already assembled quick-release fastener, so that the spring element and the locking head, after insertion in the housing, cannot unintentionally move out of the locked position.

According to another preferred embodiment of the invention the housing is constructed in two parts with two housing halves connected by a hinge, and a first mounting half is provided in a first housing half and a second mounting half in a second housing half, and the first mounting half and the second housing half form a complete mounting upon a joining of the housing halves. The fitting part is thereby preferably positioned between the housing halves so that it is enclosed on both sides, preferably on all sides, by the housing after the insertion of the fitting part and the joining of the housing halves and is protected from external effects. The fitting part is thus securely held in the mounting formed by the joined mounting halves between the housing halves of the housing and thus cannot unintentionally slip out of the mounting. Moreover, as a result, adjacent component parts are protected from direct contact with the fitting part by the housing.

In the process, the first or the second mounting half can be formed by a shell with a shape adapted to the shape of the fitting part with the inserted locking head, in which the fitting part with the inserted locking head can be accepted exclusively in a predetermined orientation. The shell thus forms an additional shape-coding by means of which it can be ensured that the fitting part can only be inserted in one direction, wherein the fitting part and/or the locking head can exhibit in this case two sides with different shapes, to whose shape the shape of the mounting halves of the housing halves are adapted. Furthermore, due to the fitted shape of the mounting half, the fitting part is held in a slide-resistant manner in the mounting half so that during the locking movement of the locking head, only the housing half with the fitting part positioned therein must be retained.

In this case it is further proposed that the protrusion is positioned on the respective other mounting half. The fitting part is as a result first inserted into the shell-like mounting half during insertion, so that the fitting part is positioned in a first step as slide-resistant in a housing half. Finally, the other housing half with the protrusion is placed on the housing half with the inserted fitting part, wherein the protrusion is introduced into the opening. In so far as the protrusion assumes the additional function of pressing the spring element or locking head into the locked position, the fitting part can thereby support itself during the displacement of the spring element or the locking head on the shell-shaped mounting half. Moreover after the insertion into the shell-shaped mounting half, the fitting part is in a defined orientation to the housing half or the mounting half with the protrusion, so that the assembly procedure is significantly eased, and the assembling person can for all intents and purposes undertake it without more detailed knowledge. In particular, the assembly does not depend on the dexterity or the knowledge of the assembling person.

It is further recommended that the housing features an opening through which the fitting part with the first opening protrudes outward. The housing thus encloses the part of the fitting part on which the locking head is held, while the section of the fitting part in which the first opening for looping through the seat belt is arranged protrudes outward and is freely accessible. With the recommended solution, the housing can even be assembled, when the seat belt is already looped through the first opening and tightly connects the fitting part with the seat belt. In addition, as a result, the housing only covers the locking section of the fitting part that is decisive for the functional certainty of the quick-release fastener, so that the housing itself can be constructed as small as possible.

It is moreover proposed that a seat belt protector enlarging the deflection radius of the belt strap guided through the opening is provided on the housing. By means of the proposed construction of the housing, a seat belt protector in the form of plastic insert part previously provided as an extra component part can be omitted. This is especially advantageous, since the seat belt protectors previously used as extra component parts were often lost or their insertion was forgotten. In addition the assembly times, and thus the associated costs are reduced by the proposed solution, since the previously required insertion of the extra component part is not necessary.

BRIEF DESCRIPTION OF THE DRAWINGS

In the following section the invention will be explained in more detail using a preferred embodiment. Shown specifically in the figures are.

FURTHER DESCRIPTION OF THE INVENTION

Figure 1:
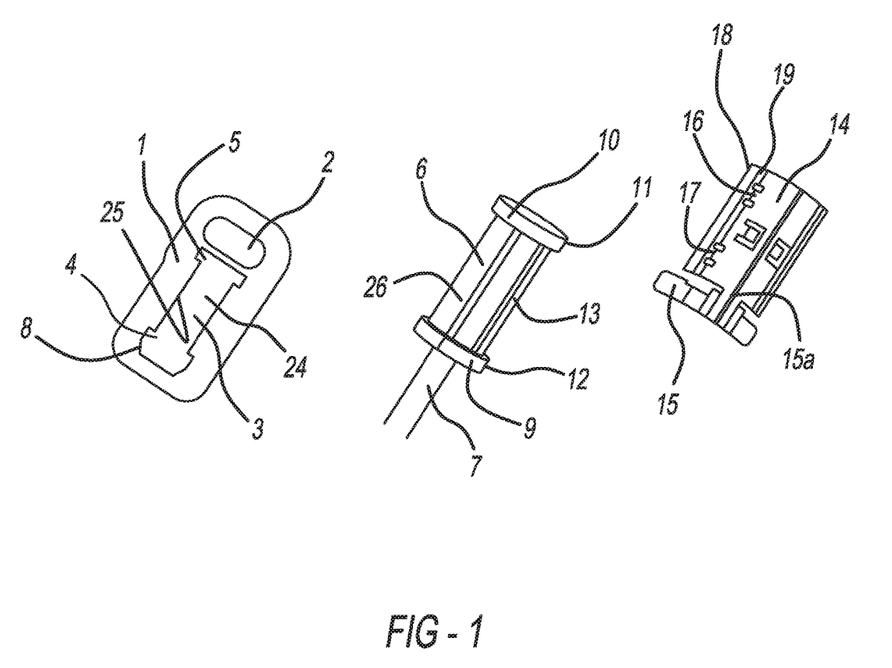
FIG. 1 shows Individual parts of a quick-release fastener before assembly.

Shown in FIG. 1 are the individual parts of a quick-release fastener without the housing 100 first shown in FIG. 5 to FIG. 13 for a better understanding of the locking mechanism before assembly. Recognizable is a fitting part 1 which is constructed as a stamped part from a metal plate and features a first opening 2 and a second opening 3. The first opening 2 is constructed with an oval-shape and serves to secure a strap of a seat belt 21 shown in FIG. 2 to FIG. 4. The end of the seat belt 21 fastened by means of the strap is as a rule the free end of a pelvis (lap) belt section of the seat belt.

The second opening 3 is constructed as a rectangle and features two opposite longer edges 24 and 25 which transition at their respective edges into recesses 4 and 5 having a larger width. The recess 4 is again narrowed, starting from the area of the larger width, by shoulders 8 protruding into the recess 4.

Also recognizable is a fastening part 7 in the form of a wire cable, which enables, for example, direct fastening to the vehicle, or it can also be part of a pretensioning device rigidly positioned on the vehicle. Provided on the end of the wire cable is a locking head 6 formed by an integrally molded metal casing. The locking head 6 itself exhibits a center section 26 with side flat areas 13 and two flanges 9 and 10 protruding radially outward bordering the center section 26 in which flanges grooves 11 and 12 are respectively provided on the side. The grooves 11 and 12 and the flat areas 13 are positioned on identically aligned sections of the outer circumference of the center area 26 and the flanges 9 and 10.

Furthermore a spring element 14 can be recognized which is constructed as a stamped part from a thin spring steel sheet and is plastically deformed during stamping to a U-shaped cross-section. The spring element 14 is shaped in cross-section to a U-shape with two opposite edges 18 bent upward and additionally exhibits outward protruding stamping 16 and 17. Between the stamping 16 and 17 and the edges 18 the spring element 14 is provided with a corrugation 19 running in the longitudinal direction of the spring element 14.

Figure 2:
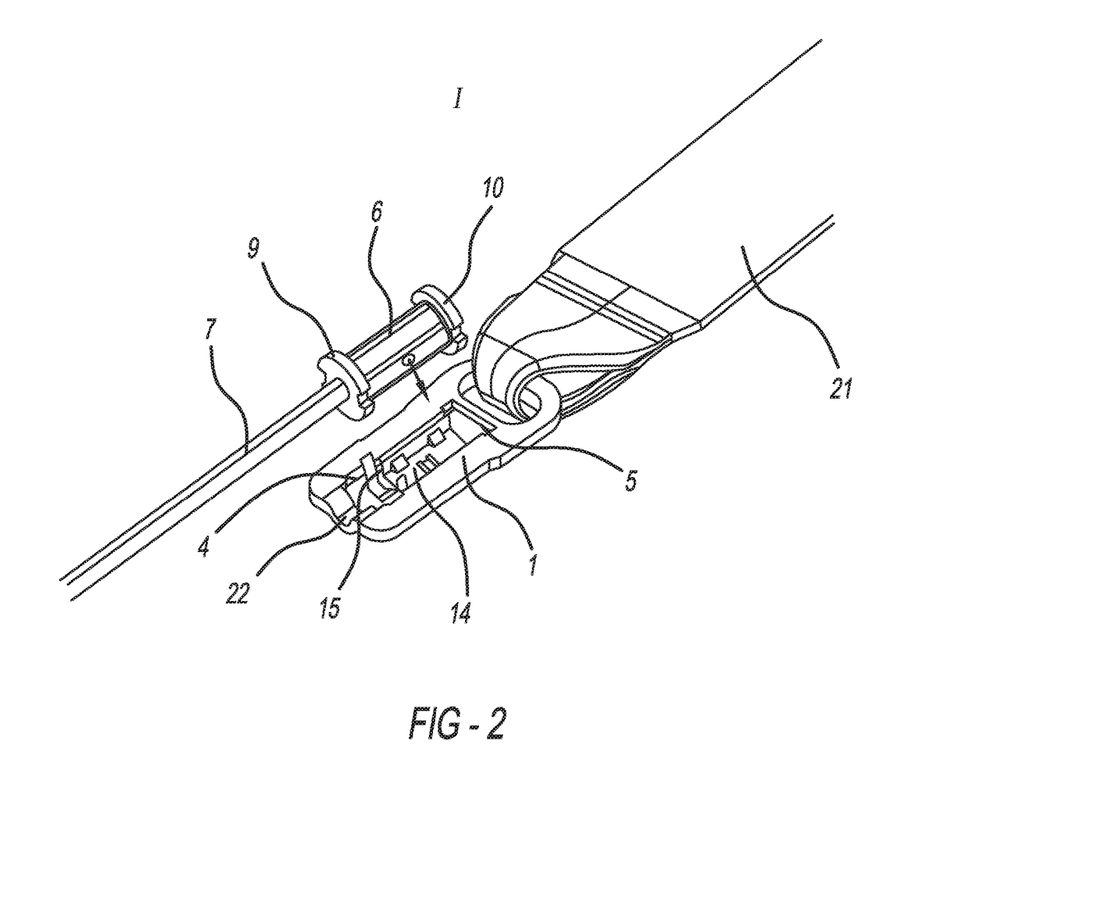
FIG. 2 shows a shows-release fastener with fitting part before assembly.

Recognizable in FIG. 2 is the quick-release fastener in a pre-assembled condition. One end of the seat belt 21 is introduced into the first opening 2 and formed into a loop. The spring element 14 is inserted into the second opening 3 in a position in which the spring element 14 with the high standing edges 18 supports itself on the edges 24 and 25 of the second opening 3. The spring element 14 thereby secures itself in the second opening 3 in which the edges 18 are pressed together, and as a result respectively exert a spring force on the edges 24 and 25 of the fitting part 1. An additional securing of the spring element 14 occurs in that the edges 24 and 25 move up against the corrugations 19. The fitting part 1 together with the spring element 14 can as a result be delivered to the vehicle manufacturer on the end of the seat belt 21 without the spring element 14 being able to slip out of the second opening 3. Also provided on one edge of the spring element 14 are two protruding spring arms 15 connecting with the spring element 14 via a material narrow point 15a. The spring arms 15 can perform independent spring movements to the spring element 14 because of the connection across the material narrow point 15a, wherein they can also feature a different spring characteristic from the spring characteristic of the spring element 14.

The fastening part 7 is then introduced into the second opening 3 with the spring element 14 inserted therein for assembly with the locking head 6, wherein the orientation of the locking head 6 during the introduction movement is so predetermined that the flanges 9 and 10 engage in the recesses 4 and 5 and the flat areas 13 are laterally aligned, so that the center section 24 comes to rest between the edges 18 of the spring element 14 and the grooves 11 and 12 come to rest in alignment with the edges 24 and 25 of the fitting part 1. A channel-shaped recess 22 is formed in the edge section of the fitting part 1 defining the second opening 3 in which the wire cable is accepted in the assembly position I, so that the fastening part 7 transfers the tensile forces that occur approximately centrally in the direction of the plane of the plate-shaped fitting part 1.

Figure 3:
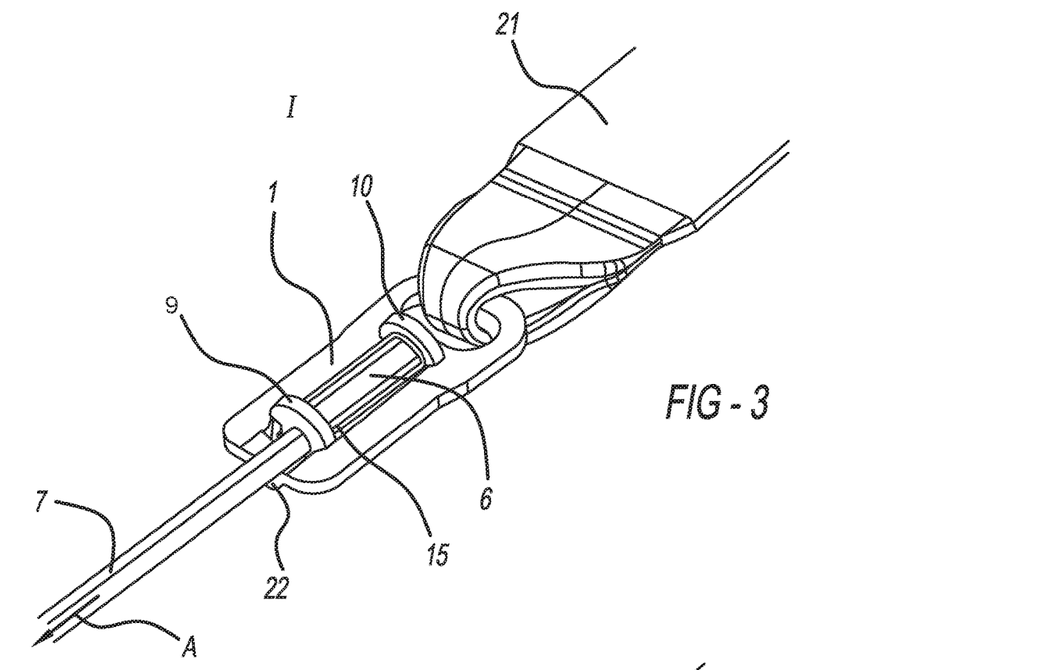
FIG. 3 shows a quick-release fastener and locking head in an assembly position.
Figure 4:
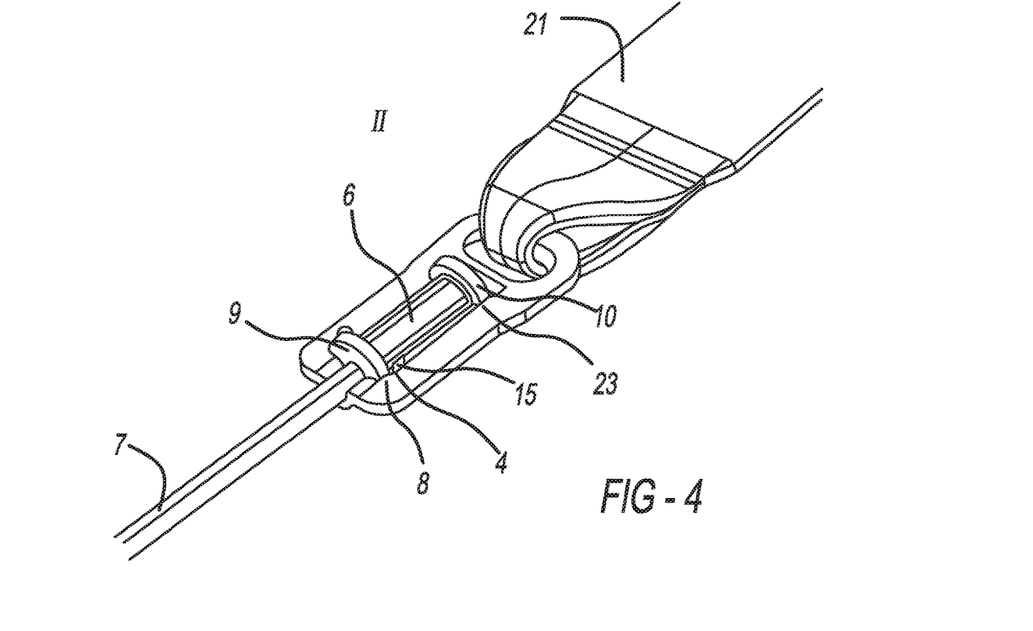
FIG. 4 shows a quick-release fastener and locking head in a locked position.

After the insertion of the locking head 6, the quick-release fastener is in an assembly position I shown in FIG. 3. Starting with the assembly position I the fastening part 7 is transferred by pulling in the direction of the arrow A into the locked position II depicted in FIG. 3. In the process, the locking head 6 undergoes a linear movement relative to the fitting part 1. Because the radially protruding flange 10 rests on the spring element 14 the spring element 14 is pushed along as well. During this displacement movement the spring element 14 is guided by the engagement of the edges 24 and 25 in the corrugations 19. By means of the relative movement of the locking head 6 a section 23 and a shoulder 8 of the edges 24 and 25 of the fitting part 1 are guided into the grooves 11 and 12 and the spring element 14 is displaced so far that the spring arms 15 come to rest in the recess 4. In this position of the locking head 6 or spring element 14 designated in this application as the locked position II the locking head 6 is secured against a backward movement into the assembly position I by the spring arms 15 locking in place in the recess 4. In addition, the locking head 6 is secured by the projections 8 engaging into the grooves 11 and 12 and the sections 23 against twisting and against movement in a lateral direction during lateral accelerations.

The advantage of the described quick-release fastener is that the relative movement of the locking head 6 from the assembly position I into the locked position II is parallel to the tensile forces acting in the loading condition of the seat belt 21 or the tensile forces exerted by a tensioning device positioned on the fastening part 7. In this way, it can be reliably prevented that the locking head 6 is released from the fitting part 1 when under load. In addition, the locking head 6 is secured against unintentional release during transverse acceleration by the fitting part 1 engaging in the grooves 11 and 12. The spring element 14 is secured in the locked position II via the spring arms 15 engaging in the recess 4 on opposite sides, so that although transverse accelerations can result in the spring arms 15 being pressed out of the recess 4 on one side, in such a case, the spring arms 15 are however also pressed into the recess 4 on the opposite side with a correspondingly higher force, so that the spring arms 15 also secure the locking head 6 during transverse accelerations by an engagement on at least one side of the spring arms 15 in the recess 4 in the longitudinal direction.

Figure 5:
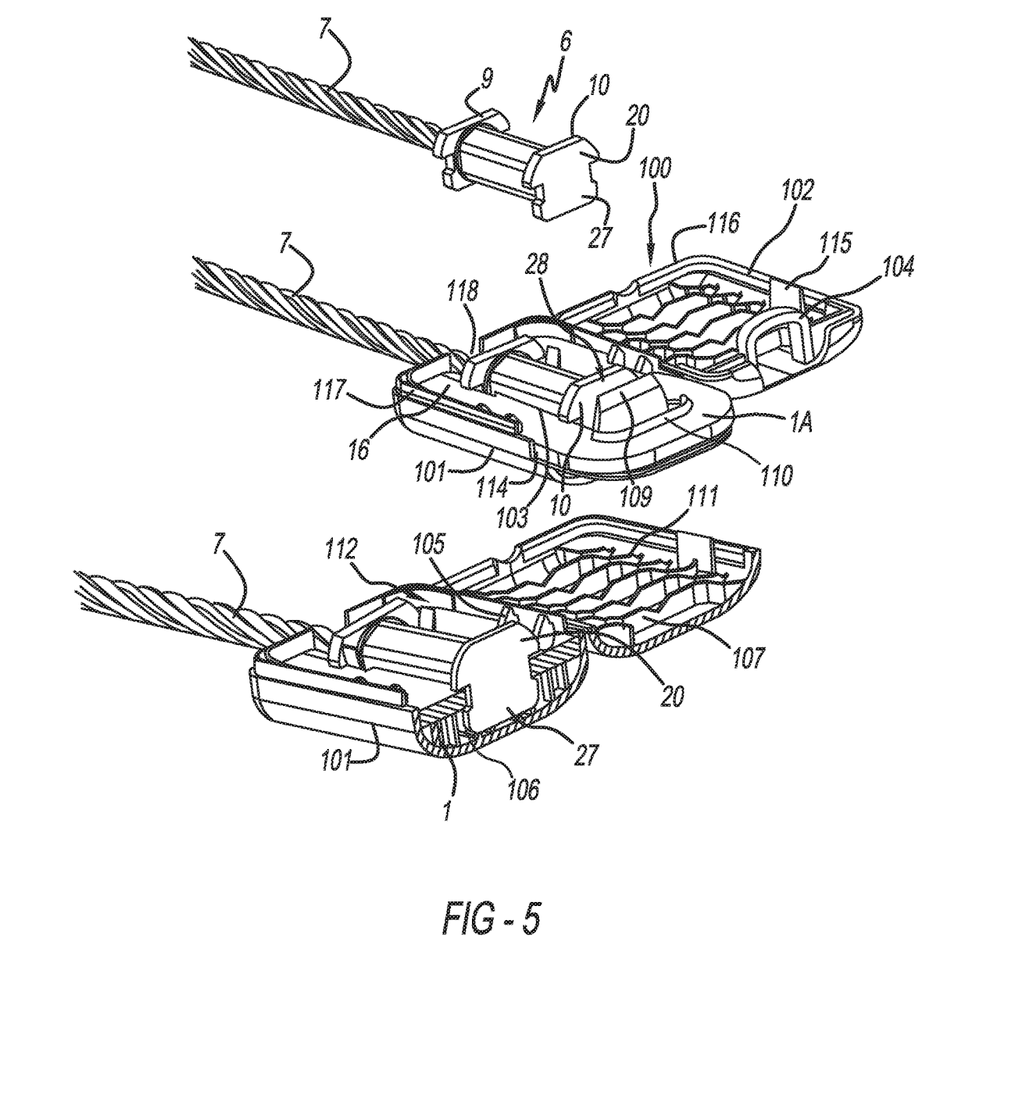
FIG. 5 shows a fastening part with locking head, fitting part and housing in various positions and in an assembled condition in the cross-section.

Recognizable in FIG. 5 is the quick-release fastener with an inventive housing 100. The housing 100 is constructed in two parts with two housing halves 101 and 102 connected to each other via a hinge 113 that can be seen in FIG. 8. A shell-shaped mounting half 106 is provided in the housing half 101 shown on the left, the shape of said housing half being adapted to the surface of the fitting part 1 with the inserted locking head 6. The adaptation of the shape of the shell consists of the first housing half 101 having, for example, an upwardly protruding edge 117 with an inner edge contour whose outer course corresponds to the outer edge of the fitting part 1. Furthermore inwardly protruding ribs 105 are provided on the edge 117 which engages in corresponding recesses on the edge of the fitting part 1. A depression is provided in the base of the first housing half 101 which is so dimensioned that the part of the locking head 6 protruding over the side area of the fitting part 1 can be accepted therein. Generally speaking, the mounting half 106 of the first housing half 101 thus reproduces an imprint of the adjacent surface of the fitting part 1 with the inserted locking head 6. The second housing half 102 is connected to the first housing half 101 on an edge side via a hinge 113 and defines a second mounting half 111 which supplements the first mounting half 106, making it into a complete mounting 112 when both housing halves 101 and 102 are connected. The second mounting half 111 is formed by a recess with partition walls 107 positioned in the base area, a protrusion 104 standing above the partition wall 107, and a thin outside edge 116. In addition a protruding latching arm 115 is provided on the edge 116. Both the edge 117 of the first housing half 101 and the edge 116 of the second housing half 102 are discontinuous on both front sides of the housing 100, wherein the gaps are so dimensioned that on one side there is a first slit-like opening 114 having the width of the fitting part 1 and on the other side a smaller second opening 118 with a width corresponding to the diameter of the fastening part 7.

Furthermore a seat belt protector 110 is integrally molded as one piece on the first housing half 101 which with the inserted fitting part 1 extends into the first opening 2 and increases the radius of the edge of the first opening 2, so that there is an enlarged deflection radius for the seat belt looped through the first opening 2.

Figure 6:
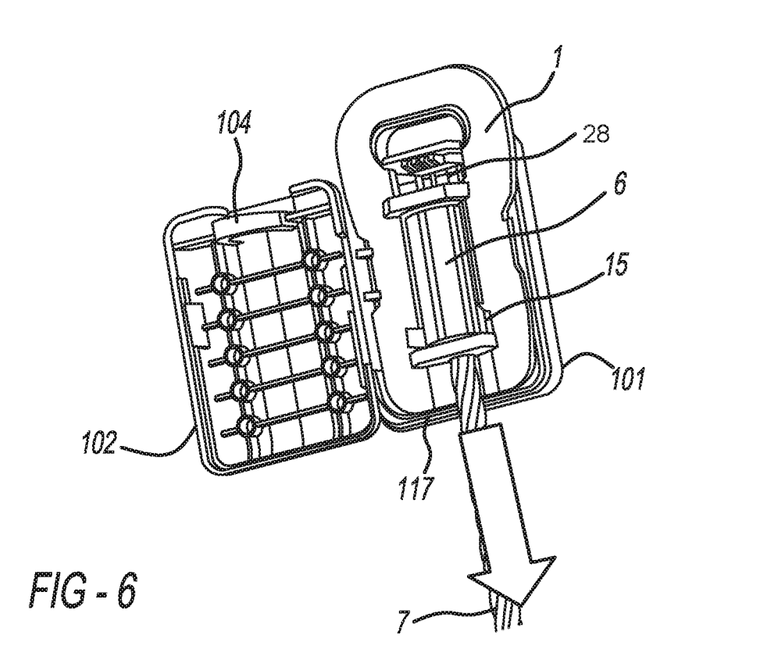
FIG. 6 shows a housing with fitting part and properly locked locking head.
Figure 7:
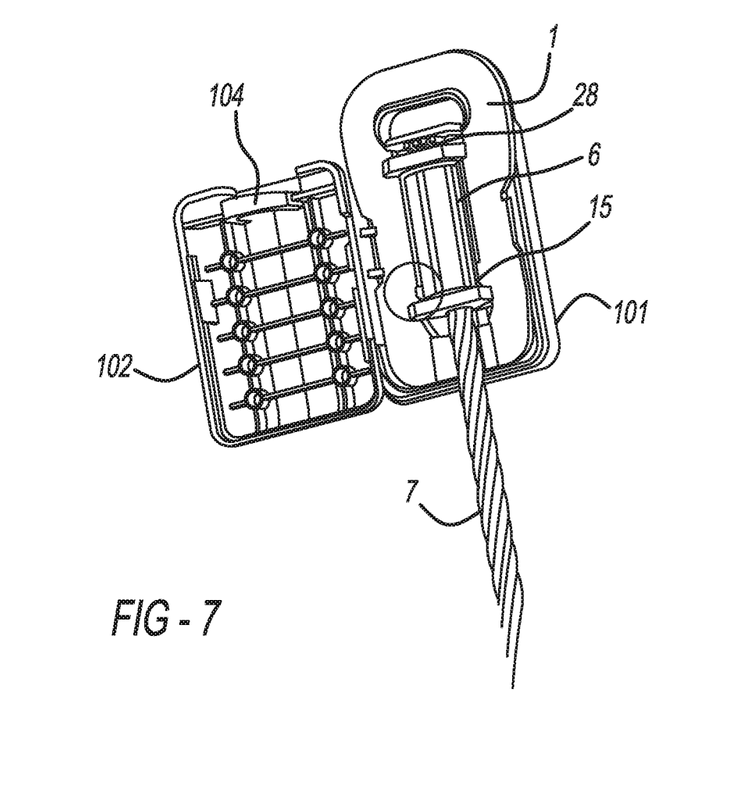
FIG. 7 shows a housing with fitting part and not properly locked locking head.
Figure 8:
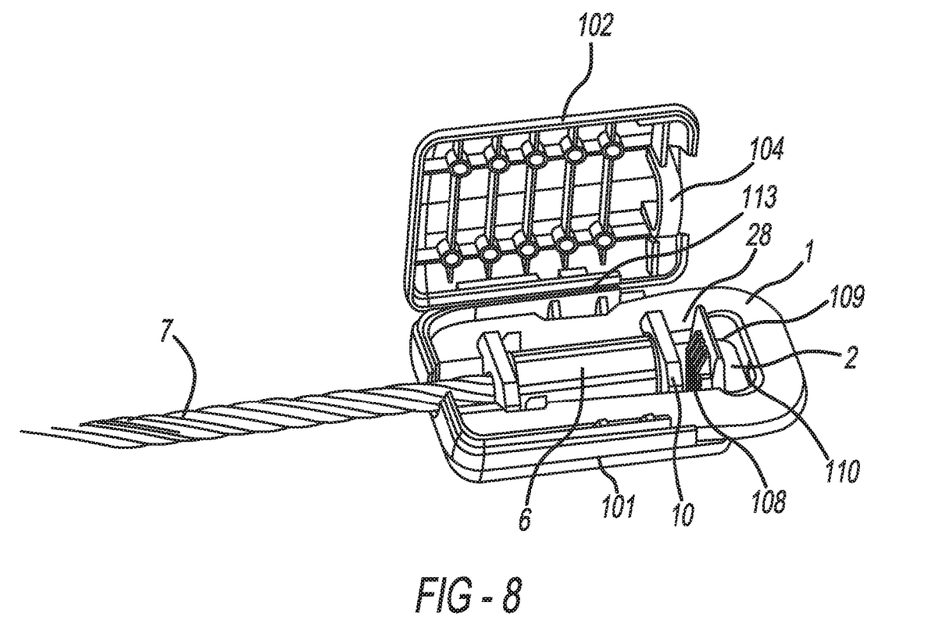
FIGS. 8 through 12 shows a housing with two housing halves with fitting part and properly locked locking head in various positions of the housing with respect to each other.
Figure 9:
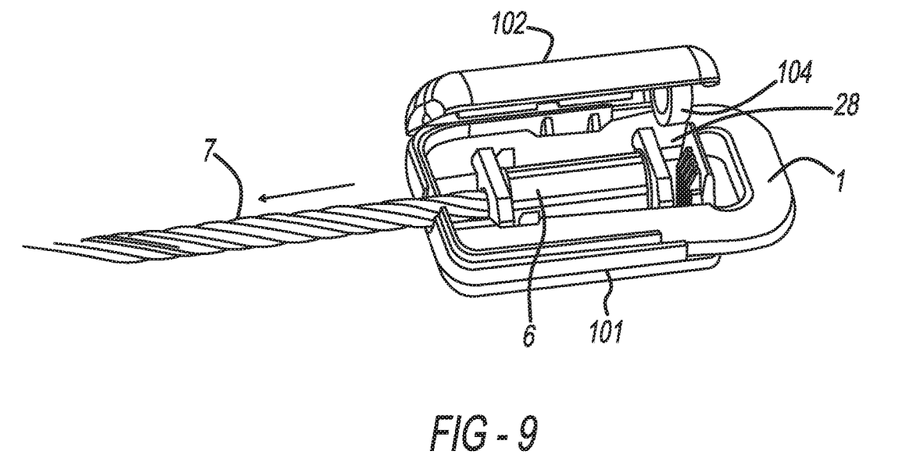
Figure 10:
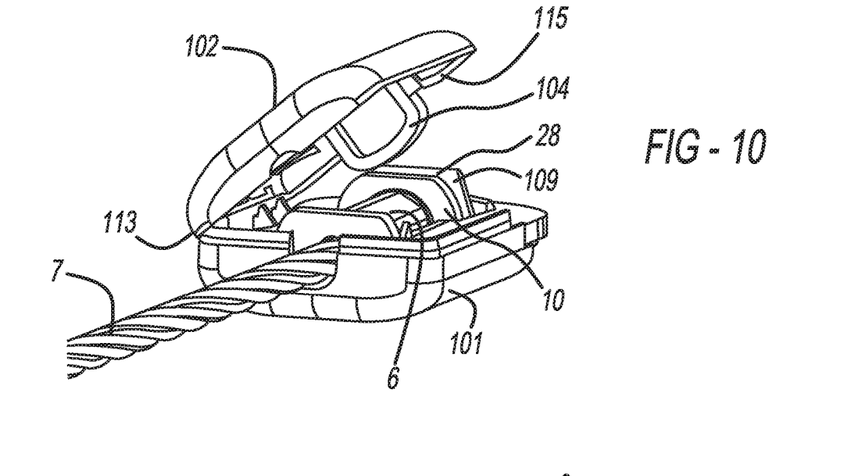
Figure 11:
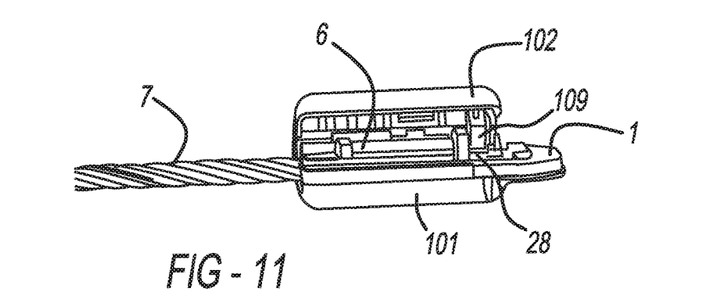
Figure 12:
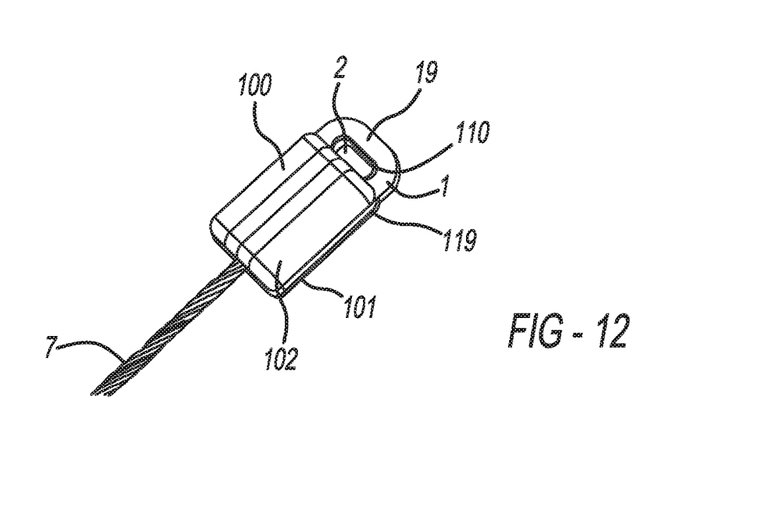
Figure 13:
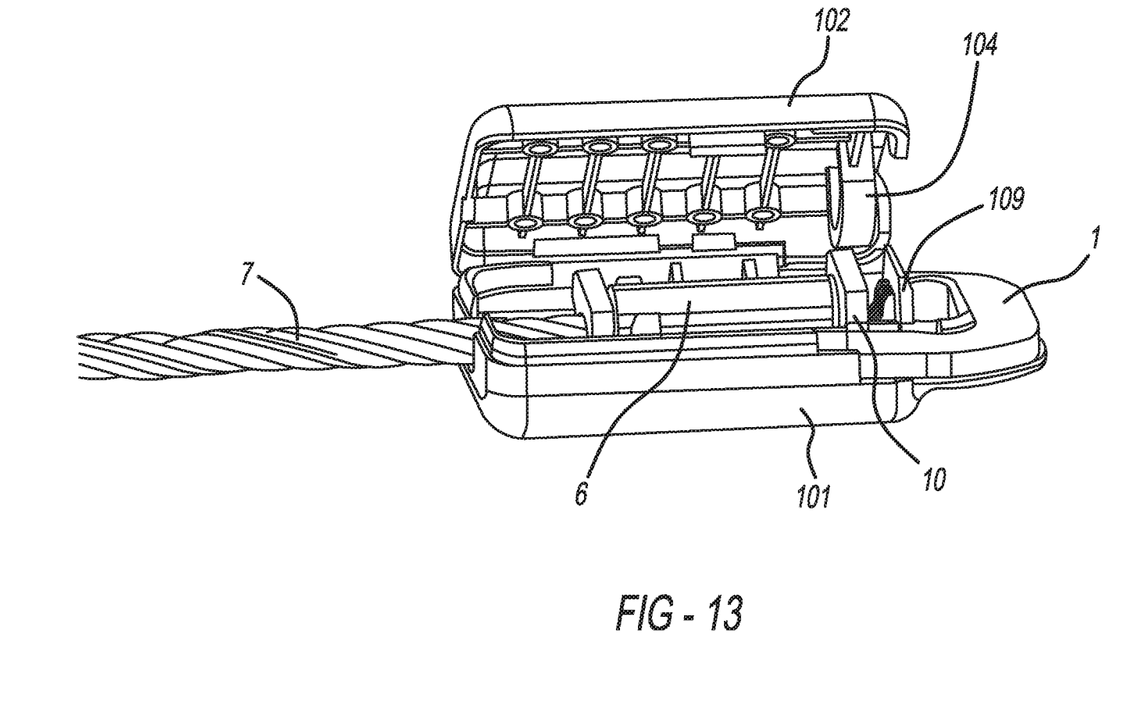
FIG. 13 shows a housing with two housing halves with fitting part and not properly locked locking head in a position in which the housing halves cannot be fastened to each other.

The assembly of the quick release fastener occurs by inserting the fitting part 1 with the inserted spring element 14 into the shell-like mounting half 106 of the first housing half 101. Due to the shape of the mounting half 106 the fitting part 1 is then held in the first housing half 101 so as not to displace. In the next step, the fastening part 7 with the locking head 6 is introduced, and as previously described in FIG. 1 to FIG. 4, locked with respect to the fitting part 1 by performing a relative movement aimed in the direction of the arrow as depicted in FIG. 6. The locking process is thereby facilitated in that the fitting part 1 is accepted in the first housing half 101 during the performance of the displacement movement so as not to displace and as a result is supported during the displacement movement on the edge 117 of the first housing half 101. When the displacement movement is completed, and the spring element 14 with the spring arm 15 is positioned in the locked position II, as can be seen in FIG. 6, an opening 28 is unblocked, which is corresponding smaller when a spring element 14 and/or locking head 6 is not properly locked, as can be recognized in FIG. 7. The opening 28 is bounded on the side by the edge of the fitting part 1 and on the front sides by the flange 10 of the locking head 6 and a raised protrusion 109 provided on the first housing half 101. The protrusion 109 exhibits a ramp-like support area 108 on its side facing the flange 10, so that overall, the opening 28 is constructed as conically tapering in the direction of the recess.

After the locking head 6 is locked with respect to the fitting part 1, the second housing half 102 is swiveled in the hinge onto the first housing half 101, wherein said first housing half moves with the protrusion 104 into the unblocked opening 28. If the locking head 6 and/or the spring element 14 is still not completely locked, the locking head 6 is further forced into the locked position II by the sliding of the protrusion 104 on the ramp-like support area 108. In the final position of the assembled housing halves 101 and 102 the protrusion 104 secures the locking head 6 against any unintended sliding out of the locked position II by the front-side support on the flange 10. In order to fasten the second housing half 102 onto the first housing half 101, the protruding latching arm 115 then engages behind a non-depicted latching contour on the first housing half 101.

In the assembled final position of the two housing halves 101 and 102 they enclose the fitting part 1 in one section 1b which is provided to accept the locking head 6, while a section 1b with the first opening 2 to loop the seat belt through the slit-like opening 114 of the housing 100 protrudes outward. The fitting part 1 is enclosed all around by the housing 100 in section 1b, so that the fitting part 1, and in particular the locked locking head 6 with the spring element 14, is protected from external effects, and in addition adjacent component parts of the vehicle are protected with respect to the fitting part 1. The mounting halves 106 and 111 contribute, in the assembled position of the housing halves 101 and 102, to a complete mounting 112 in which the fitting part 1 with the locking head 6 and the spring element 14 can only be completely accepted when the locking head 6 and/or the spring element 14 is positioned in the locked position II. If the locking head 6 for example was not at all displaced with respect to the fitting part 1 in the direction shown in FIG. 6, the locking procedure in effect having been forgotten; it is not possible, as can be recognized in FIG. 13, to swivel the second housing half 102 for connection with the first housing half 101, since the locking head 6 with the flange 10 does not unblock the opening 28 and the second housing half 102 with the protrusion 104 comes to rest in a blocking manner on the flange 10. The protrusion 104, due to its position, forms a shape-coding of the second housing half 102 which only allows a joining of both housing halves 101 and 102 when the locking head 6 is either already positioned in the locked position II or is at least so far displaced that the protrusion 104 can be introduced into the opening 28.

By means of the partition walls 107 parallel rectangular-shaped recesses are formed in the second mounting half, into which the flanges 9 and 10 of the locking head 6 can dip, so that the locking head 6 is also secured against displacement. Moreover these partition walls 107 serve to stiffen the second housing half 102 without excessively increasing the weight of the injected plastic volume.

While the above description constitutes the preferred embodiment of the present invention, it will be appreciated that the invention is susceptible to modification, variation and change without departing from the proper scope and fair meaning of the accompanying claims.

The invention claimed is:

1. A quick-release fastener for one end of a seat belt adapted to be fastened in a vehicle, comprising:
   a fitting part,
   a fastening part adapted to be affixed to the vehicle,
   a first opening in the fitting part in which the end of the seat belt can be fastened and a second opening in the fitting part, in which the fastening part is locked with a locking head in a locked position of the quick-release fastener, wherein a spring element disposed in the second opening is displaceable from an assembly position to the locked position, and a locking head of the fastening part can be introduced into the second opening in which the spring element is positioned in the assembly position, and the spring element is configured to be displaced from the assembly position into the locked position by performing a relative movement between the locking head and the fitting part in a direction of a tensile force acting between the fastening part and the fitting part when the seat belt is under a load, the spring element securing the locking head against sliding out, a housing with a mounting adapted to the shape of the fitting part with the locking head contained therein is provided, wherein the mounting is so shaped that the fitting part with the locking head can only be completely accepted in the mounting if the locking head and the spring element are positioned in the locked position.

2. A quick-release fastener for one end of a seat belt adapted to be fastened in a vehicle comprising:

a fitting part, a fastening part adapted to be affixed to the vehicle, a first opening is provided in the fitting part in which the end of the seat belt can be fastened and a second opening is provided in which the fastening part can be locked with a locking head, wherein a spring element disposed in the second opening is displaceable from an assembly position to a locked position, and a locking head of the fastening part can be introduced into the second opening in which the spring element is positioned in the assembly position, and the spring element is configured to be moved by performing a relative movement of the locking head to the fitting part into the locked position securing the locking head against sliding out, a housing with a mounting adapted to the shape of the fitting part with the locking head contained therein is provided, wherein the mounting is so shaped that the fitting part with the locking head can only be completely accepted in the mounting if the locking head and the spring element is positioned in the locked position, wherein at least one protrusion is provided on the mounting of the housing which is so positioned such that, in the locked position, the protrusion engages into an opening released by the movement of the spring element or the locking head from the assembly position into the locked position.

3. The quick-release fastener according to claim 2, wherein the protrusion is shaped and positioned on the mounting that it forces the locking head and the spring element into the locked position during introduction into the opening.

4. The quick-release fastener according to claim 2, wherein the protrusion is so shaped and positioned, that the protrusion secures the spring element and the locking head in the position engaging in the opening against a sliding out of the locked position.

5. The quick-release fastener according to claim 1, wherein the housing is constructed in two parts with two housing halves connected by a hinge a first mounting half is provided in a first housing half and a second mounting half is provided in a second housing half, and the first and second mounting half form a complete mounting by joining the housing halves.

6. The quick-release fastener according to claim 5, wherein the first or the second mounting halves is formed by a shell with a shape adapted to the fitting part with the inserted locking head, in which shell the fitting part with the inserted locking head can be accepted in only one exclusively predetermined orientation.

7. The quick-release fastener according to claim 5, wherein a protrusion (104) is positioned on one of the other mounting.

8. The quick-release fastener according to claim 1, wherein the housing features a third opening through which the fitting part with the first opening protrudes outward.

9. A quick-release fastener for one end of a seat belt adapted to be fastened in a vehicle comprising:

a fitting part, a fastening part adapted to be affixed to the vehicle, a first opening is provided in the fitting part in which the end of the seat belt can be fastened and a second opening is provided in which the fastening part can be locked with a locking head, wherein a spring element disposed in the second opening is displaceable from an assembly position to a locked position, and a locking head of the fastening part can be introduced into the second opening in which the spring element is positioned in the assembly position, and the spring element is configured to be moved by performing a relative movement of the locking head to the fitting part into the locked position securing the locking head against sliding out, a housing with a mounting adapted to the shape of the fitting part with the locking head contained therein is provided, wherein the mounting is so shaped that the fitting part with the locking head can only be completely accepted in the mounting if the locking head and the spring element is positioned in the locked position, further comprising a seat belt protector on the housing, projecting into the first opening enlarging the deflection radius of the belt guided through the opening.

* * * * *